United States Patent
Yokoyama

(10) Patent No.: US 9,279,979 B2
(45) Date of Patent: Mar. 8, 2016

(54) OPTICAL SCANNING DEVICE AND IMAGE FORMING APPARATUS

(71) Applicant: Yukihisa Yokoyama, Kanagawa (JP)

(72) Inventor: Yukihisa Yokoyama, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/715,842

(22) Filed: May 19, 2015

(65) Prior Publication Data

US 2015/0338641 A1    Nov. 26, 2015

(30) Foreign Application Priority Data

May 22, 2014  (JP) ................. 2014-106592

(51) Int. Cl.
*G02B 26/10* (2006.01)
*G02B 26/08* (2006.01)
*G03G 15/043* (2006.01)

(52) U.S. Cl.
CPC ........ *G02B 26/0816* (2013.01); *G02B 26/0875* (2013.01); *G02B 26/105* (2013.01); *G03G 15/043* (2013.01)

(58) Field of Classification Search
CPC .......... G02B 26/0816; G02B 26/0875; G02B 26/105; G03G 15/043
See application file for complete search history.

(56) References Cited

U.S. PATENT DOCUMENTS

| | | | |
|---|---|---|---|
| 7,126,735 B1 | 10/2006 | Kinoshita et al. | |
| 8,018,637 B2 | 9/2011 | Ichii | |
| 2014/0009555 A1 | 1/2014 | Itami et al. | |
| 2014/0204166 A1 | 7/2014 | Itami et al. | |
| 2014/0240795 A1* | 8/2014 | Kudo | G02B 26/123 358/475 |
| 2015/0097910 A1 | 4/2015 | Itami et al. | |

FOREIGN PATENT DOCUMENTS

| | | |
|---|---|---|
| JP | 2006-323278 | 11/2006 |
| JP | 2007-240590 | 9/2007 |
| JP | 2014-029482 | 2/2014 |
| JP | 2014-142370 | 8/2014 |
| JP | 2015-004714 | 1/2015 |
| JP | 2015-014625 | 1/2015 |
| JP | 2015-075610 | 4/2015 |

* cited by examiner

*Primary Examiner* — Sarah Al Hashimi
(74) *Attorney, Agent, or Firm* — Oblon, McClelland, Maier & Neustadt, L.L.P.

(57) ABSTRACT

An optical scanning device includes: a common optical deflector that deflects light beams from light source devices; and a scanning optical system that focuses the deflected light beams on different scanning surfaces. All the light beams from the light source devices are incident on the optical deflector in directions oblique to a normal line of the scanning surfaces in a main-scanning cross section and to a normal line of a deflecting reflection plane of the optical deflector in a sub-scanning cross section. The scanning optical system includes individual lenses which are individually arranged for the respective light beams and have a plane shape symmetric in the main-scanning direction and satisfies a predetermined condition, and an optical axis of the individual lens is arranged obliquely to the normal line of the scanning surface in the main-scanning cross section so as to satisfy a predetermined condition.

8 Claims, 11 Drawing Sheets

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2014-106592 filed in Japan on May 22, 2014.

BACKGROUND OF THE INVENTION

1. Field of the Invention

The present invention relates to an optical scanning device and an image forming apparatus such as a digital copier, a printer, a plotter, and a facsimile using the optical scanning device.

2. Description of the Related Art

In the related art, with respect to an optical scanning device or an image forming apparatus using the optical scanning device, there is known an optical scanning device which deflects a light flux by a deflection unit such as an optical deflector, focuses the deflected light flux as micro-sized spot light on a scanning surface to scan the scanning surface in a main-scanning direction at a constant speed, and the optical scanning device is applied as a latent image writing unit or the like of an image forming apparatus such as a digital copier, a laser beam printer, a laser beam plotter, and a facsimile.

The optical scanning device scans the scanning surface such as a photoconductor by deflecting and reflecting, for example, laser light emitted from a laser light source by the optical deflector and, at the same time, writes an image on the scanning surface by intensity-modulating (for example, on or off) the laser light according to an image signal.

In addition, with respect to a color image forming apparatus, there is an image forming apparatus of obtaining a two-colored image, a multi-colored image, a full-colored image by using two or more sets of an optical scanning device and a photoconductor, and such an image forming apparatus is called a "tandem type image forming apparatus".

As the tandem type image forming apparatus, for example, Japanese Laid-open Patent Publication No. 2006-323278 discloses a so-called opposite scan type optical scanning device of performing optical scanning on the left and the right by a single optical deflector, and this optical scanning device is well known.

In this manner, if the optical deflector is commonly used in a plurality of scanning surfaces, the number of optical deflectors is reduced, so that there is an advantage in that a small-sized, low-cost optical scanning device can be implemented.

In addition, in the optical scanning device used for the tandem type image forming apparatus, as measures for promoting low cost, Japanese Laid-open Patent Publication No. 2007-240590 discloses an oblique incidence optical system which allows a light flux to be incident on a deflecting reflection plane of an optical deflector with an angle in a sub-scanning direction.

In the oblique incidence optical system, a plurality of light fluxes are deflected and reflected on the respective deflecting reflection planes and are separated and guided to the corresponding scanning surfaces by a folding mirror or the like. In this case, a sub-scanning direction angle (hereinafter, referred to as an "oblique incidence angle") of each light flux incident on the optical deflector is set as an angle where each light flux can be separated by the folding mirror.

Therefore, by thinning the optical deflector in the sub-scanning direction, a low-cost optical scanning device can be implemented.

In addition, in the case of using a polygon mirror for the optical deflector, high energy is not needed for high speed rotation, and it is possible to implement low power consumption and low noise.

On the contrary, in oblique incidence optical system, the sub-scanning direction shift amount varies due to the optical path length difference, so that there is the problem (hereinafter, referred to "scan line curve") that the scan line on the sub-scanning is curved in the sub-scanning direction.

Therefore, in generally, the methods of removing the first order component of the scan line curve by the scan line tilt adjustment and removing the second order component of the scan line curve by the scan line bend adjustment are well known.

For example, in Japanese Laid-open Patent Publication No. 2007-240590, the scan line tilt is corrected by rotating the scanning lens about an axis parallel to the optical axis, and the scan line bend is corrected by bending the scanning lens so that the center of curvature of the scanning lens in the sub-scanning direction is adjusted and moved in the sub-scanning direction.

However, on the other hand, there is a so-called "sag" where, since the center of a polygon mirror is not coincident with a deflecting reflection plane, the reflection position of the light flux incident from the light source by the deflecting reflection plane varies according to the rotation of the polygon mirror.

When a main light beam of the deflected light flux which is deflected by the polygon mirror is perpendicular to the scanning surface, if the direction of the main light beam is defined as a reference line, the sag occurs asymmetrically with respect to the deflected light fluxes at the both sides of the reference line.

Therefore, asymmetry occurs in the optical path length difference of the light flux scanning the scanning surface, so that an asymmetric component occurs in the scan line curve. Particularly, in a wide angle-of-view optical system for implementing a small-sized optical scanning device demanded in the recent years, the sag is increased, so that the asymmetry of the scan line curve greatly occurs.

In addition, in the scan line tilt adjustment and the scan line bend adjustment described above, the third order component or the higher order components of the scan line curve, that is, asymmetric components are not completely removed, and when the latent images drawn by the respective light fluxes are superposed and visualized by the respective color toners, color shift occurs.

With respect to the correspondence to the asymmetric portion, Japanese Laid-open Patent Publication No. 2007-240590 discloses the correspondence to the asymmetric component of the scan line curve by configuring the scanning lens to be asymmetric in the main-scanning direction with respect to the optical axis.

However, in the above-described opposite scan type optical scanning device, in the opposite side, the scanning lens is used in a state of being inverted about the optical axis, and thus, there is a problem in that the optical scanning device cannot cope with the asymmetric component of the scan line curve and the optical performance of the optical system at the opposite side is greatly deteriorated.

In addition, Japanese Laid-open Patent Publication No. 2006-323278 discloses a technique where the number of folding mirrors is regulated so that it can be commonly used for scanning lenses having an asymmetric shape. However, since the number of arranged folding mirrors of the entire optical system is regulated, there is a problem in that the limitation of layout is high.

There is a need to provide an optical scanning device capable of correcting an asymmetric component of scan line curve with a simple configuration irrespective of layout while using common lenses.

SUMMARY OF THE INVENTION

It is an object of the present invention to at least partially solve the problems in the conventional technology.

An optical scanning device includes: a plurality of light source devices; a common optical deflector that deflects light beams from the light source devices; and a scanning optical system that focuses the deflected light beams on different scanning surfaces to scan the scanning surfaces in a main-scanning direction. All the light beams from the light source devices are incident on the optical deflector in directions oblique to a normal line of the scanning surfaces in a main-scanning cross section and to a normal line of a deflecting reflection plane of the optical deflector in a sub-scanning cross section. The scanning optical system includes a common lens which is commonly used for the light beams scanned by the same deflecting reflection plane and individual lenses which are individually arranged for the respective light beams and have a plane shape symmetric in the main-scanning direction. When a light flux whose sub-scanning position of when reaching the scanning surface is farthest from a sub-scanning position at a central image height is defined as a first light flux, and a light flux toward an edge image height closer to where the first light flux reaches is defined as a second light flux, and an optical path length of the first light flux from the individual lens to the scanning surface is denoted by La, a power in the sub-scanning direction at a position where the first light flux passes through the individual lens is denoted by $\phi a$, an emission angle of the first light flux from the individual lens in the main-scanning cross section is denoted by $\omega a$, an optical path length of the second light flux from the individual lens to the scanning surface is denoted by Lb, a power in the sub-scanning direction at a position where the second light flux passes through the individual lens is denoted by $\phi b$, and an emission angle of the second light flux from the individual lens in the main-scanning cross section is denoted by $\omega b$, the individual lens satisfies the following condition formula (6).

$$\frac{(L_b\phi_b - 1)\cos\omega_a}{(L_a\phi_a - 1)\cos\omega_b} < 1 \quad (6)$$

An optical axis of the individual lens is arranged obliquely to the normal line of the scanning surface in the main-scanning cross section such that the following condition formula (7) is satisfied, when a sub-scanning position shift amount of the first light flux on an image plane by tilting the individual lens is denoted by $\Delta Va$, and a difference between a central image height and a sub-scanning position of the first light flux on the image plane of when the individual lens is not tilted is denoted by $\delta$.

$$|\Delta V_a| < \frac{|2\delta|}{1 - \frac{(L_b\phi_b - 1)\cos\omega_a}{(L_a\phi_a - 1)\cos\omega_b}} \quad (7)$$

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B illustrate a thick polygon mirror which needs to be used in the related art, and FIG. 3C illustrates a thin polygon mirror used in the first embodiment of the present invention;

FIG. 17A illustrates the case of using a typical scan type optical scanning device, and FIG. 17B illustrates the case of applying the embodiment to an opposite scan type optical scanning device;

DETAILED DESCRIPTION OF THE PREFERRED EMBODIMENTS

Figure 1:
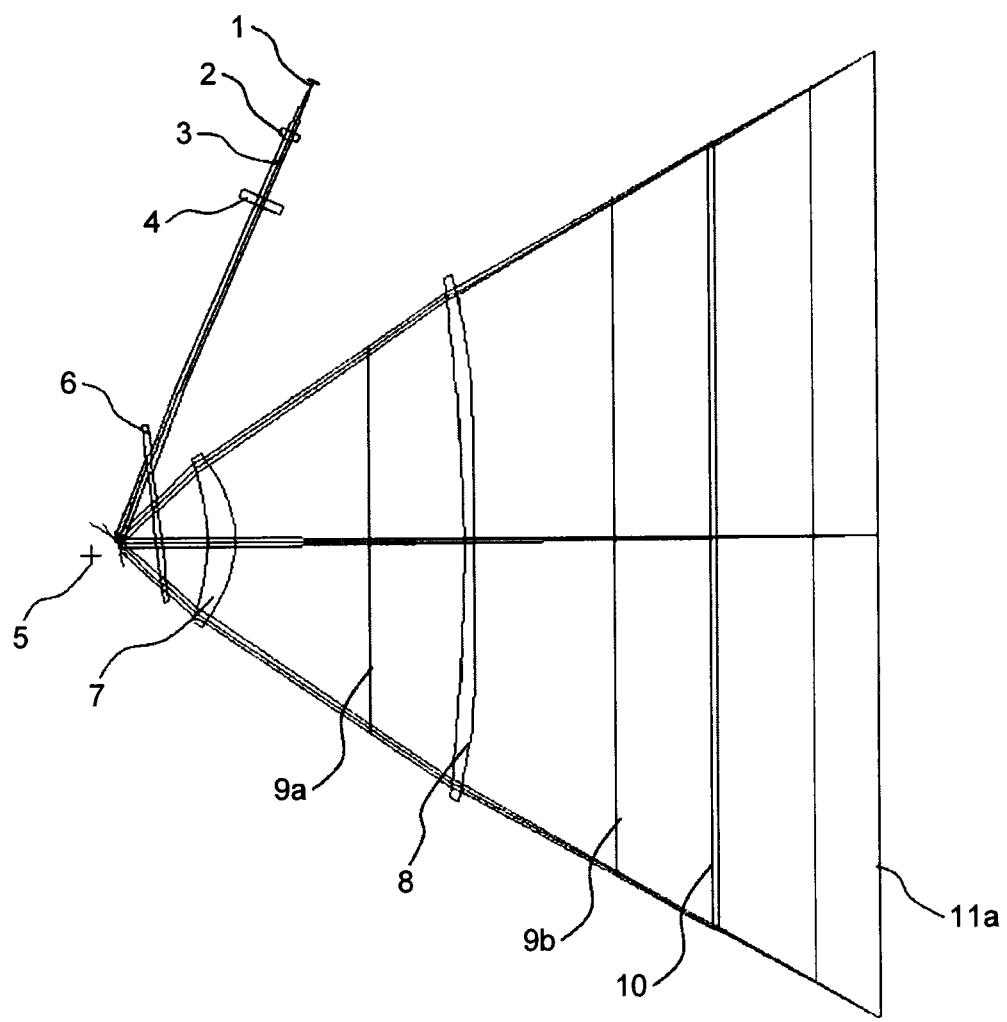
FIG. 1 is a schematic plan cross-sectional diagram illustrating main components of an optical scanning device according to a first embodiment of the present invention as partially cut in a plane perpendicular to a rotation axis of an optical deflector.

Before description of specific embodiments, features, functions, and effects of the present invention will be described.

According to an aspect of the present invention, there is provided an optical scanning device which includes a plurality of light source devices and deflects light beams from the light source devices by a common optical deflector and focuses the light beams on different scanning surfaces by a scanning optical system to scan the scanning surfaces in a main-scanning direction, wherein all the light beams of the light source devices are incident on the optical deflector in the directions oblique to a normal line of the scanning surface in a main-scanning cross section and to a normal line of a deflecting reflection plane of the optical deflector in a sub-scanning cross section, the scanning optical system includes a common lens which is commonly used for the light beams scanned by the same deflecting reflection plane and individual lenses which are individually arranged for the respective light beams and have a plane shape symmetric in the main-scanning direction, when a light flux whose sub-scanning position at the time of reaching the scanning surface is farthest from a sub-scanning position at a central image height is defined as a first light flux, and a light flux toward an edge image height closer to where the first light flux reaches is defined as a second light flux, and an optical path length of the first light flux from the individual lens to the scanning surface is denoted by La, a power in the sub-scanning direction at a position where the first light flux passes through the individual lens is denoted by φa, an emission angle of the first light flux from the individual lens in the main-scanning cross section is denoted by ωa, an optical path length of the second light flux from the individual lens to the scanning surface is denoted by Lb, a power in the sub-scanning direction at a position where the second light flux passes through the individual lens is denoted by φb, and an emission angle of the second light flux from the individual lens in the main-scanning cross section is denoted by ωb, the individual lens satisfies the following condition formula (6), $$\frac{(L_b\phi_b - 1)\cos\omega_a}{(L_a\phi_a - 1)\cos\omega_b} < 1 \tag{6}$$

an optical axis of the individual lens is arranged obliquely to the normal line of the scanning surface in the main-scanning cross section such that the following condition formula (7) is satisfied, when a sub-scanning position shift amount of the first light flux on an image plane by tilting of the individual lens is denoted by ΔVa, and a difference between a central image height and the sub-scanning position of the first light flux on the image plane in the case where the individual lens is not tilted is denoted by δ.

$$|\Delta V_a| < \frac{|2\delta|}{1 - \frac{(L_b\phi_b - 1)\cos\omega_a}{(L_a\phi_a - 1)\cos\omega_b}} \tag{7}$$

According to the above configuration, it is possible to provide an optical scanning device suppressing scan line curve to be small irrespective of layout with a simple configuration by using a common lens by correcting an asymmetric component (undulation component) of the scan line curve by tilting a scanning lens under specific conditions.

In addition, it is preferable that, in the optical scanning device according to the present invention, a power of the individual lens in the sub-scanning direction continuously decrease from an on-axis portion to an off-axis portion in the main-scanning direction.

According to the above configuration, it is possible to effectively correct curve with causing the surplus high order component due to titling the lens not to be included in the correction of the curve, by monotonously decreasing a sub-scanning power of a lens toward an off-axis portion.

Figure 14:
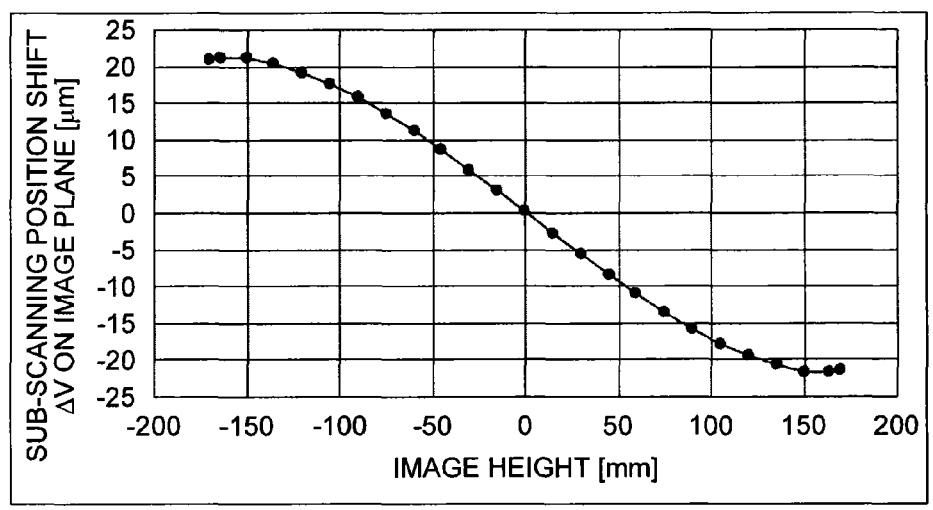
FIG. 14 is an image height/image plane sub-scanning position shift relationship diagram illustrating a sub-scanning position shift ΔV on an image plane of a light flux toward each image height in the case where a lens is tilted 0.35 degrees such that the end of a second scanning lens closer to the light source becomes closer to a polygon mirror in a main-scanning cross-section in the embodiment.

Regarding this, as can be seen from FIG. 14 described later, a differential amount (tilt) of the sub-scanning position shift amount ΔV is decreased toward the off-axis portion, so the undulation of the ΔV occurs. With respect to the condition formula (1) as follows, since L (optical path length from the lens to the scanning surface) and ΔZ (refracting sub-scanning position shift amount) monotonously increases, in order to gradually decrease the ΔV while allowing the differential amount to cause the surplus high order component not to be included, Φ (sub-scanning direction power) needs to monotonously decrease.

$$\Delta V = (L\Phi - 1)\Delta Z \quad (1)$$

Therefore, it is preferable that, with respect to the second scanning lens, the sub-scanning direction power φ continuously decrease from the on-axis portion toward the off-axis portion in the main-scanning direction.

In addition, it is preferable that, the optical scanning device according to the present invention, the scanning optical system be disposed such that elements of the scanning optical system face each other with the optical deflector interposed therebetween, and all the individual lens facing each other have the same shape.

Figure 16:
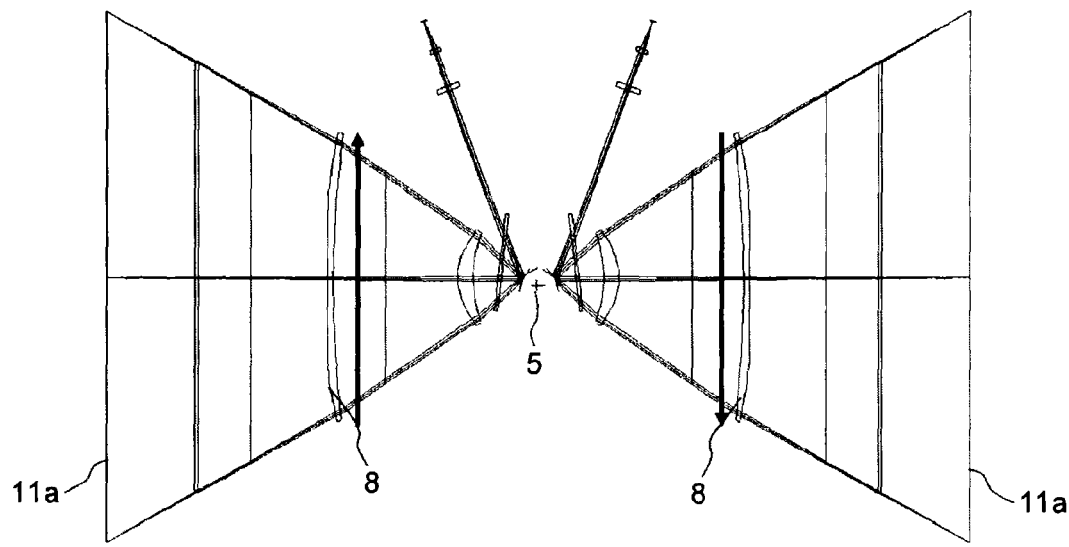
FIG. 16 is a cross-sectional diagram illustrating main components of an opposite scan type optical scanning device capable of more effectively obtaining the effects by applying the present invention as viewed in a direction parallel to a plane formed by an axis line of a main-scanning beam.
Figure 17A:
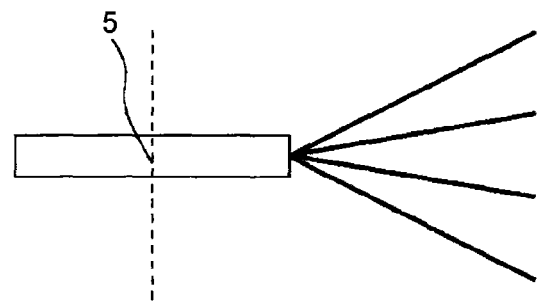
FIGS. 17A and 17B are diagrams illustrating an oblique incidence angle with respect to a sub-scanning reflection plane of a polygon mirror.
Figure 17B:
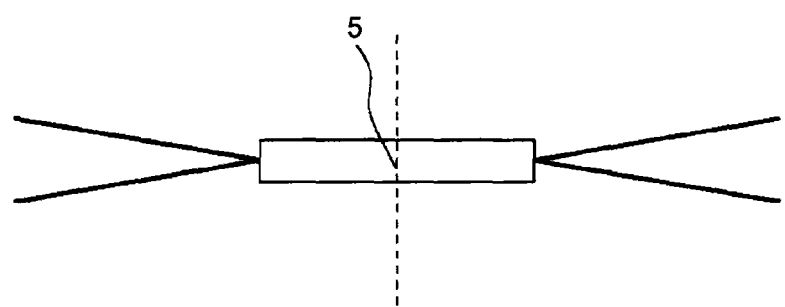

That is, in the so-called opposite scan type optical scanning device in which it is difficult to configure the second scanning lens 8 to have an asymmetric shape in the main-scanning direction, as illustrated in FIG. 16, a plurality of photoconductors are scanned by a single optical deflector by arranging the optical system at the opposite sides of the polygon mirror 5 as the optical detector and by performing distribution to the opposite directions of the left and right with the polygon mirror 5. In addition, due to combination with the oblique incidence optical system according to the embodiment, as illustrated in FIGS. 17A and 17B, the oblique incidence angle in the sub-scanning cross section can be set to be small, so that it is possible to improve the optical performance regarding the scan line curve and the like.

However, in the opposite scan type optical scanning device, the scanning lens is used while being inverted as indicated by the arrow direction of FIG. 16, and in the scanning lens having an asymmetric shape in the main-scanning direction, the optical performance at the opposite side cannot be maintained. Therefore, for example, a lens having a different shape where asymmetry of the lens shape is inverted in the main-scanning direction needs to be used.

Therefore, by applying the present invention to an opposite scan type system having a symmetric shape in the main-scanning direction, it is possible to simultaneously achieving low cost and reduction in scan line curve by using the lens having the same shape for each optical system.

In addition, it is preferable that, in the optical scanning device according to the present invention, the scanning optical system include a scan line tilt adjustment mechanism which adjusts a sub-scanning direction tilt of a scan line for scanning the scanning surface in the main-scanning direction. By installing such a tilt adjustment mechanism, it is possible to perform adjustment at a good accuracy in response to different lens tilt amounts depending on the optical systems.

That is, since a magnitude of the asymmetric component of the scan line curve varies depending on a difference in positions of optical elements, the lens tilt amounts for correcting the asymmetric component are also different. Therefore, by practicing the present invention, the tilt adjustment amounts for adjusting the first order component of the curve occurring in the scanning optical system also becomes different. Therefore, by installing the tilt adjustment mechanism where an optical element used for adjustment is movable, it is possible to perform the adjustment at a good accuracy in response to the tilt amount of each lens.

In addition, it is preferable that, in the optical scanning device according to the present invention, when a light flux which reaches an image height axis-symmetric to an image height where the first light flux reaches, about a central image height is defined as a third light flux, difference between a sub-scanning position of the scanning surface where the third light flux reaches and the sub-scanning position of the central image height be substantially the same as the difference between the sub-scanning position where the first light flux reaches and the sub-scanning position of the central image height.

According to the above configuration, the residuals of the scan line curve are allowed to be in a form of a fourth order function, and thus, the third order component is completely removed, so that the p-v value of the scan line curve can be minimized.

Figure 18:
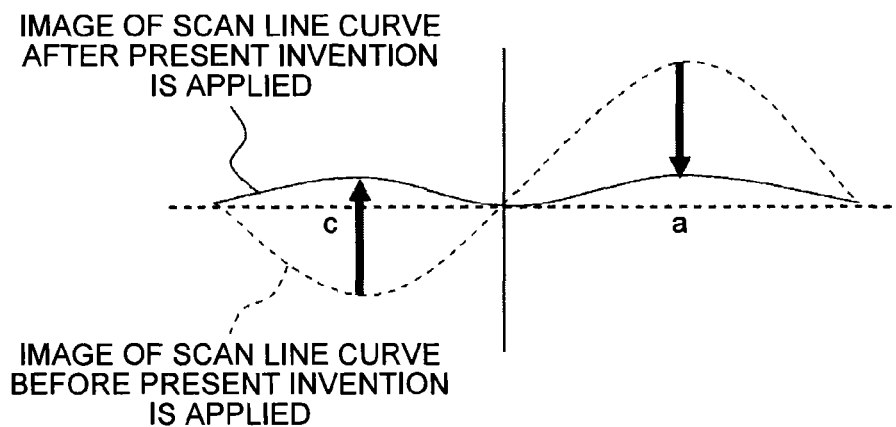
FIG. 18 is a scan line curve shape diagram illustrating images of scan line curves as comparison of the case of applying the present invention and the case where the present invention is not applied.

That is, the object of the present invention is to remove the component of a third order function, which is particularly large, from the undulation components of the scan line curve. Therefore, as illustrated in FIG. 18, when the present invention is applied, the scan line curve which may remain becomes a fourth order component which is the next largest component.

That is, if the present invention is applied to minimize the p-v value of the scan line curve, the scan line curve at the image height c axis-symmetric to the image height a about the central image height is substantially coincident with the scan line curve at the image height a in terms of direction and size. In addition, since the fourth order component or higher order components is very smaller than the first, second, and third order components, the color shift is at a level which allows the color shift to be ignored.

In addition, it is preferable that an imaging magnification ratio β in the sub-scanning direction of the scanning optical system be |β|≤1.5.

According to the above configuration, by applying the present invention to an optical system having a small sub-scanning magnification ratio, it is possible to suppress the influence of the lens tilt on the optical performance.

Figure 19:
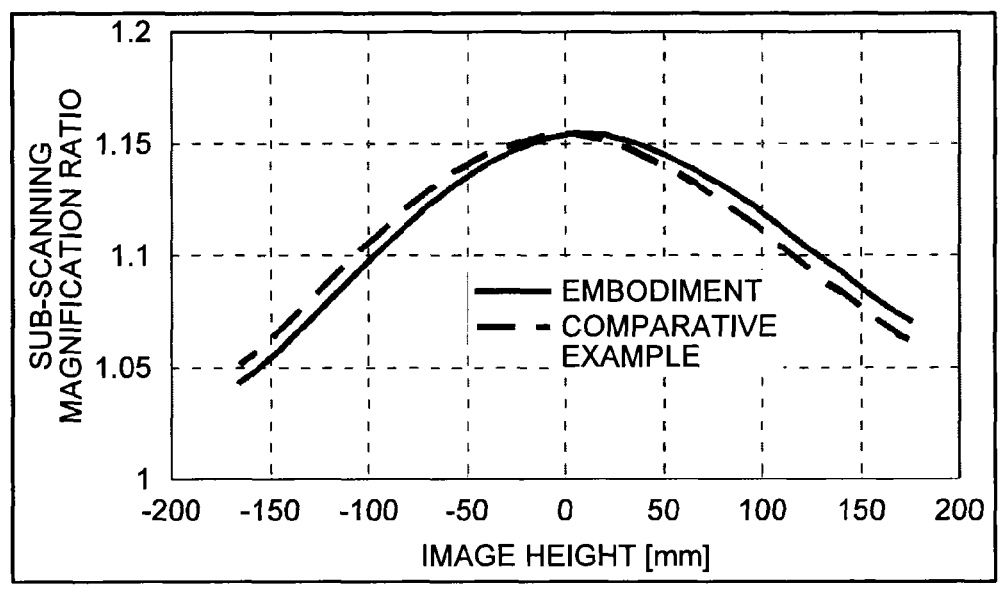
FIG. 19 is an image height/sub-scanning magnification ratio relationship diagram illustrating sub-scanning magnification ratios with respect to each image height as comparison of the embodiment where the scanning lens is tilted and the case where the scanning lens is not tilted.

Regarding this, as can be seen from the embodiment and Comparative Example, namely, FIG. 19 illustrating how the sub-scanning magnification ratio changes before and after the lens tilt, in the present invention, the scanning lens is tilted and the sub-scanning magnification ratio deviation between the image heights is disturbed, so that the asymmetry of the curve is corrected. Therefore, by applying the present invention to an optical system having a small sub-scanning magnification ratio, it is possible to suppress the influence on the optical performance by disturbing the magnification ratio deviation.

In addition, it is preferable that, in the optical scanning device according to the present invention, after the second light flux is deflected by the optical deflector, an angle formed by the second light flux and the normal line of the scanning surface in the main-scanning cross section be 40° or more.

Figure 20:
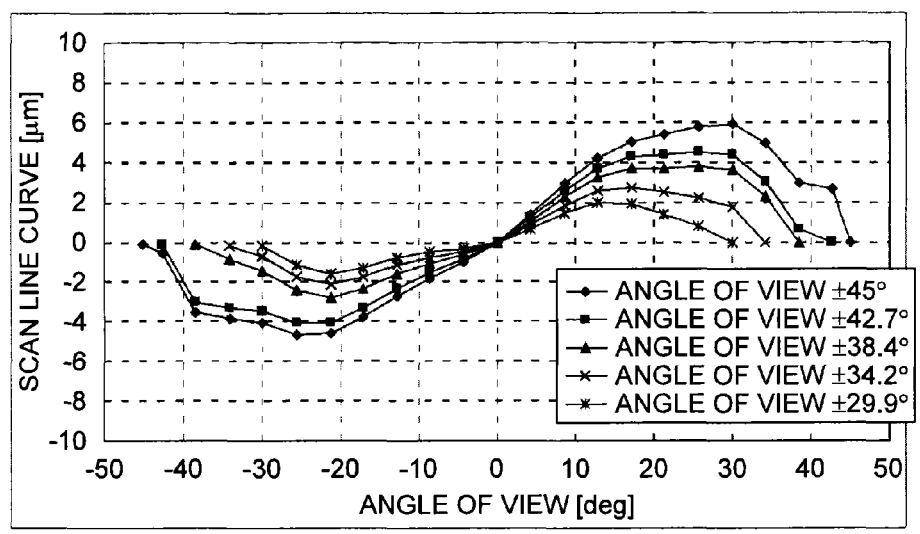
FIG. 20 is an angle-of-view/scan line curve relationship diagram illustrating scan line curve with respect to each angle of view representing an asymmetric component of the scan line curve in the case where the angle of view is changed in the embodiment.

According to the above configuration, it is possible to further improve the effect of the present invention by applying the present invention to a wide angle-of-view optical system where asymmetry of curve is large. Regarding this, as can be seen from FIG. 20 illustrating a state of am asymmetric component of scan line curve when the angle of view is changed, the asymmetric component of the scan line curve increases as the angle of view of the optical system increases. This is because due to the widening of the angle of view, the optical scanning needs to be performed on the position where the rotation angle of the polygon mirror becomes large, so that the above-described sag increases. For this reason, the present invent is more effectively operated with respect to a wide angle-of-view optical system where asymmetry of curve is large.

According to an aspect of the present invention, there is provided an image forming apparatus of forming an image by performing an electrophotography process, including any one of the optical scanning devices disclosed above as a unit of performing an exposing process of the electrophotography process.

According to the above configuration, it is possible to implement an image forming apparatus having advantages (effect) of the included optical scanning device. That is, it is possible to provide an image forming apparatus capable of securing a reproducibility of a high-quality image without color shift by effectively correcting scan line curve.

Hereinafter, an optical scanning device and an image forming apparatus according to embodiments will be described in detail with reference to the drawings.

Figure 2:
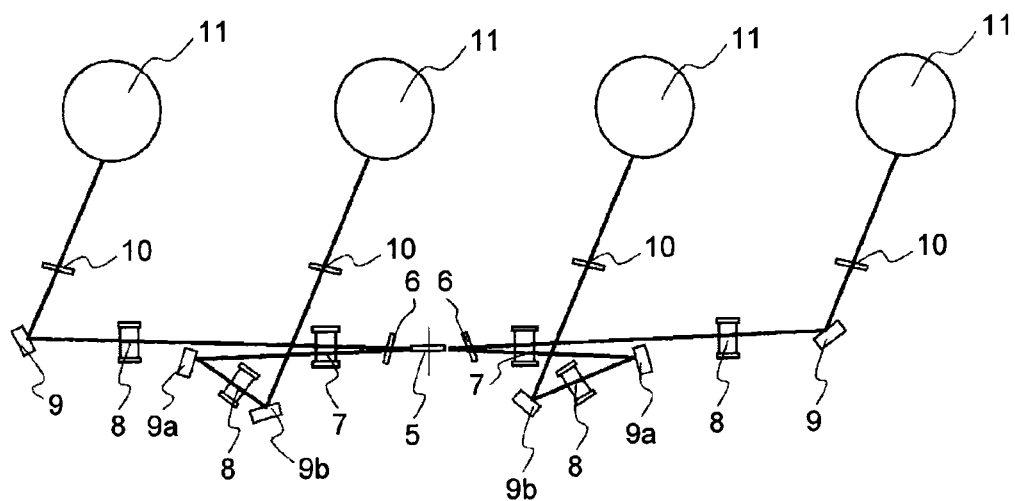
FIG. 2 is a schematic front cross-sectional diagram illustrating main components of an image forming apparatus using the optical scanning device illustrated in FIG. 1 as a configuration on a sub-scanning cross-section viewed from a direction parallel to a plane formed by an axis line of a main-scanning beam is partially cut.

First, an overview of a configuration of an optical scanning device according to a first embodiment and a configuration of an image forming apparatus according to a second embodiment will be described with reference to FIGS. 1 and 2. FIG. 1 is a schematic plan cross-sectional diagram illustrating main components of an optical scanning device according to an embodiment of the present invention as partially cut in a plane perpendicular to a rotation axis of an optical deflector, FIG. 2 is a schematic front cross-sectional diagram illustrating main components of the image forming apparatus according to the second embodiment of the present invention, as a configuration on a sub-scanning cross-section viewed from a direction parallel to a plane formed by an axis line of a main-scanning beam is partially cut.

A divergent light flux (hereinafter, sometimes referred to as a "light beam") emitted from a semiconductor laser 1 as a light source is converted into a form of a light flux appropriate for the following optical system by a coupling lens 2. The form of the light flux converted by the coupling lens 2 may be a parallel light flux or may be a slightly divergent light flux or a slightly convergent light flux. The light flux of the coupling lens 2 passes through an aperture 3 to be focused in a sub-scanning direction by a cylindrical lens 4 and is incident on a deflecting reflection plane of an optical deflector 5 (hereinafter, sometimes referred to as a "polygon mirror").

Next, the light flux reflected by the deflecting reflection plane is deflected with a constant angular velocity according to a constant-speed rotation of the polygon mirror 5 and is focused on a scanning surface 11a of a photoconductor 11 through a common lens 7 (hereinafter, sometimes referred to as a "first scanning lens"), an individual lens 8 (hereinafter, sometimes referred to as a "second scanning lens"), a folding mirror 9, and an anti-vibration glass 10. In addition, the optical deflector 5 is enclosed within a casing for not penetrating wind noise associated with high speed rotation, and incidence and emission of the laser light flux of the light source are performed through a soundproof glass 6.

Therefore, the deflected light flux forms a light spot on the scanning surface and performs optical scanning of the scanning surface.

Next, an oblique incidence method with respect to the polygon mirror in the optical scanning device according to the first embodiment will be described.

Figure 3A:
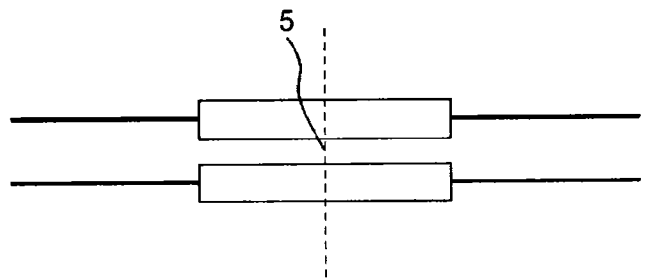
FIGS. 3A to 3C are cross-sectional diagrams in a sub-scanning direction of a periphery of a polygon mirror which is an optical deflector.
Figure 3B:
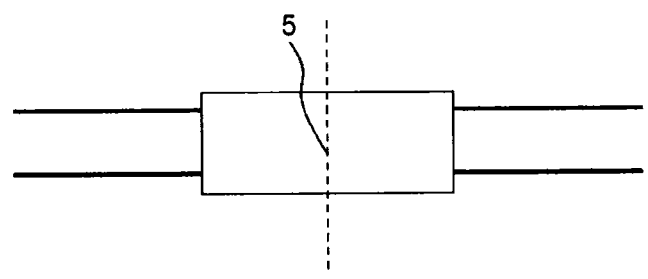
Figure 3C:
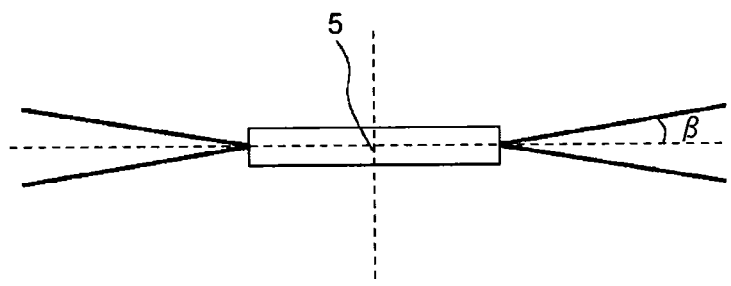

FIG. 3C is a sub-scanning direction cross-sectional diagram of a periphery of the polygon mirror 5 used for the optical scanning device according to the first embodiment and illustrates an incidence state of the light beam with respect to the polygon mirror 5.

In the oblique incidence method, the light beam from the light source is incident obliquely to a plane perpendicular to the rotation axis of the polygon mirror 5 or a horizontal plane including a normal line of the deflecting reflection plane of the polygon mirror 5. Therefore, the light beam reflected by the deflecting reflection plane is also oblique to the plane (horizontal plane). A tilt angle in the sub-scanning direction with respect to the propagation direction of the light flux is referred to as an "oblique incidence angle" and is denoted by β in this specification.

Accordingly, like FIG. 3A or 3B as a horizontal incidence method, the light flux can be split so as to be guided to each scanning surface without using a thick polygon mirror in the sub-scanning direction, so that it is possible to implement a low-cost, low-power-consumption, low-noise optical scanning device.

In the configuration where the optical axis of the semiconductor laser 1 as a light source device, the coupling lens 2, and the cylindrical lens 4 is arranged obliquely to the horizontal plane, the light beam having an angle with respect to the plane perpendicular to the rotation axis of the polygon mirror 5 may be incident on the deflecting reflection plane of the polygon mirror 5 with a desired angle or may be incident with an angle given by using an incidence mirror. In addition, by tilting the optical axis of the cylindrical lens 4 with respect to the propagation direction of the light beam toward the sub-scanning direction, the light beam toward the deflecting reflection plane may be given with an angle.

Next, the "scan line curve" which is an important problem of the oblique incidence method will be described.

For example, as long as the shape in the main-scanning direction of the incidence plane of the scanning lens (second scanning lens 8 in the embodiment) having a strong refractive power in the sub-scanning direction is not an arc shape having the reflection point of the light beam of the deflecting reflection plane of the polygon mirror 5 as a center, the distance from the deflecting reflection plane of the polygon mirror 5 to the scanning lens incidence plane varies depending on the lens height in the main-scanning direction.

In general, if the scanning lens is configured to have the aforementioned, it is difficult to maintain optical performance. That is, as illustrated in FIG. 1, a normal light beam is deflected and scanned by the polygon mirror 5, and on the main-scanning cross section of each image height of the second scanning lens 8 which is the scanning lens, the normal light beam is not vertically incident on the lens plane but incident with an incidence angle with respect to the main-scanning direction.

As illustrated in FIG. 3A or 3B, in the case of the normal horizontal incidence to the deflecting reflection plane of the polygon mirror, although the distance from the deflecting reflection plane to the scanning lens incidence plane varies, since the light beam propagates to be horizontal to the scanning lens, the incidence position in the sub-scanning direction on the scanning lens does not vary, and the scan line curve does not occur.

However, as illustrated in FIG. 3C, in the case of the oblique incidence to the deflecting reflection plane of the polygon mirror 5 with an angle with respect to the sub-scanning direction, the optical path length of the light beam deflected and reflected by the polygon mirror 5 from the deflecting reflection plane of the polygon mirror 5 to the scanning lens incidence plane varies depending on the image height, and the incidence height to the scanning lens in the sub-scanning direction is the higher position or the lower position with respect to the light flux toward the central image height as closer to the periphery.

As a result, when the light beam passes through the plane having a refractive power in the sub-scanning direction of the scanning lens, the refractive power to be suffered in the sub-scanning direction varies, so that the scan line curve occurs.

In general, in order to correct the scan line curve, the above-described scan line tilt adjustment and scan line bend adjustment are performed, or a special plane with the sub-scanning direction tilt varying depending on a position in the main-scanning direction is used as the scanning lens plane.

However, as another factor that the optical path length from the deflecting reflection plane of the polygon mirror 5 to the scanning lens incidence plane varies depending on the image height, there is a so-called "sag" where, if a light beam is incident on the polygon mirror 5 in an oblique direction (oblique to the normal line of the scanning surface) in the main-scanning cross section, the position of the deflecting reflection point varies depending on the rotation of the deflecting reflection plane.

Figure 4:
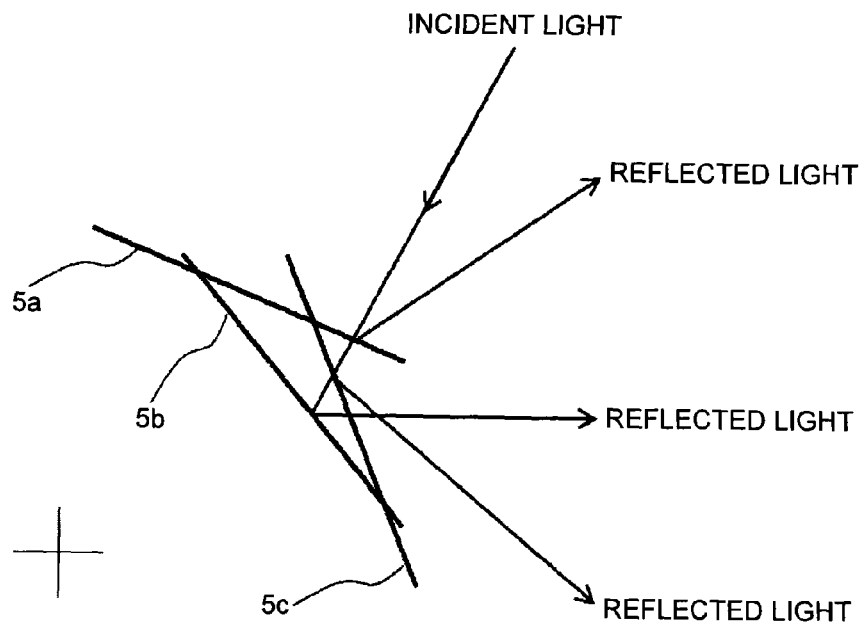
FIG. 4 is a schematic cross-sectional diagram illustrating a shift of a position (image height) of incident light reflected on a deflecting reflection plane of a polygon mirror according to rotation of the polygon mirror as cut in a direction perpendicular to the rotation axis of the polygon mirror.

FIG. 4 illustrates how the light flux (incidence light) from the light source is reflected toward each image height (reflected light or scanning light) while the deflecting reflection plane varies as 5a, 5b, and 5c according to the clockwise rotation of the polygon mirror 5. In general, the light flux reflected toward the central image height is set to be substantially parallel to the optical axis of the next scanning optical system.

Due to the "sag", between the image heights corresponding to positions closer to and farther from the light source and symmetric to each other about the central image height in the main-scanning direction, there is a difference in position of the deflecting reflection position as illustrated in FIG. 4, the optical path length difference occurs, so that the asymmetric component is included in the scan line curve.

Figure 10:
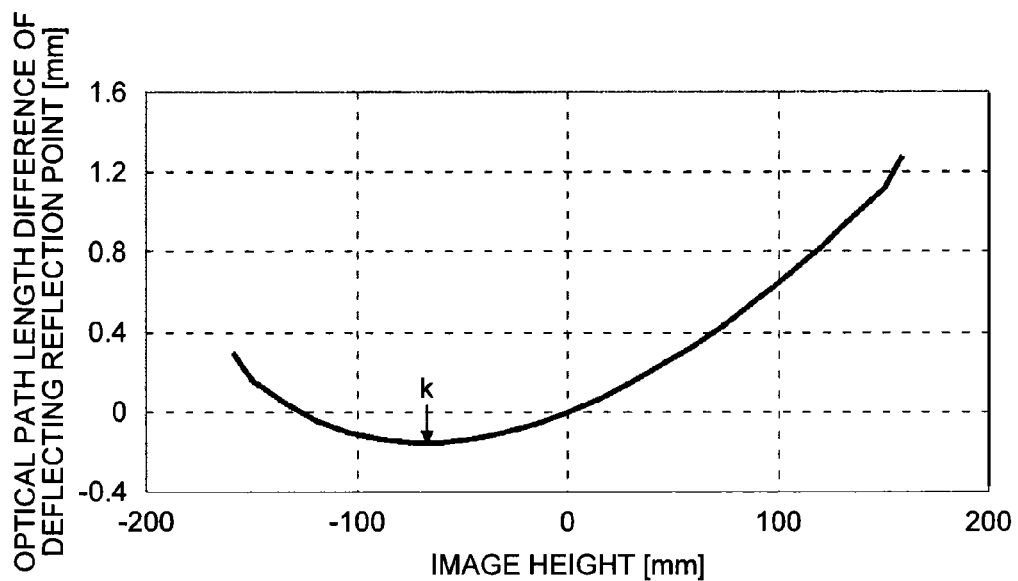
FIG. 10 is an image height/optical path length difference relationship diagram illustrating a light flux toward each image height and an optical path length difference of a deflecting reflection point of a light flux toward a central image height in the embodiment.

As an example representing the asymmetry of the "sag", as the later-described embodiment, FIG. 10 illustrates the optical path length difference of the deflecting reflection points between the light flux toward each image height and the light flux toward the central image height. The optical path length difference occurs asymmetrically with respect to the central image height. In addition, the extreme value K of the "sag" may be at any image height including the image height at the plus side.

Figure 11:
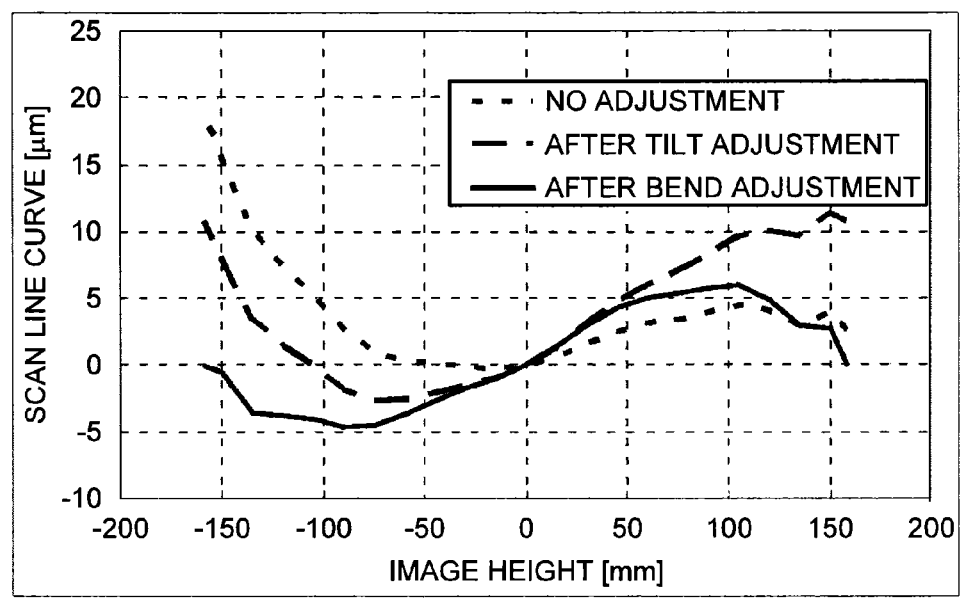
FIG. 11 is an image height/scan line curve relationship diagram illustrating scan line curves with respect to image heights in the case where there is no adjustment, the case where tilt adjustment is performed, and the case where bend adjustment is performed when an optical system like the embodiment is used.

However, in the case where the shape which is symmetric with respect to the scanning lens in the main-scanning direction is used, in the above-described scan line curve correction method, the asymmetric component of the scan line curve cannot be corrected. For example, FIG. 11 illustrates a change of the curve when the scan line tilt adjustment and furthermore the scan line bend adjustment are performed on the scan line curve of the optical scanning device having the "sag" of FIG. 10. In addition, in the embodiment, the tilt adjustment is performed by tilting the folding mirror 9 with respect to the optical axis, and the bend adjustment is performed by bending the second scanning lens 8 to the sub-scanning direction.

Although the first order component of the curve is corrected by performing the tilt adjustment and the second order component of the curve is corrected by performing the bend adjustment, the third order component or high order components, that is, the asymmetric components of the curve cannot be removed. Therefore, when the light flux is scanned, the focusing is performed to be undulated in the sub-scanning direction on the scanning surface, so that the image quality is deteriorated.

Therefore, in the first embodiment of the present invention, the undulation component of the scan line curve is corrected by obliquely arranging the scanning lens having a power in the sub-scanning direction so that the optical axis satisfies a condition with respect to the normal line of the scanning surface.

Figure 5:
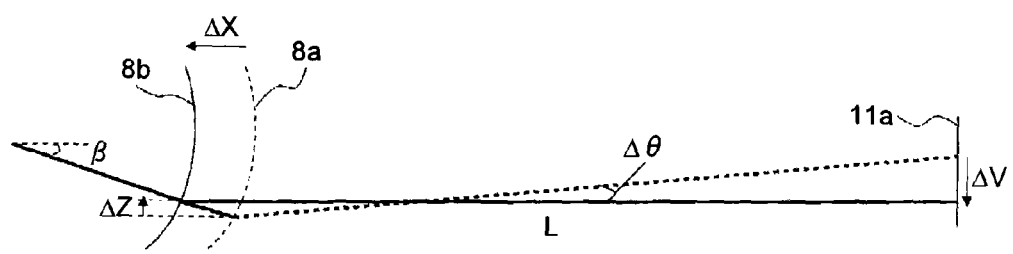
FIG. 5 is a sub-scanning direction cross-sectional diagram illustrating a shift of a light flux according to $\Delta X$ movement of a lens plane of an individual lens from 8a to 8b due to rotation eccentricity of the individual lens.
Figure 6:
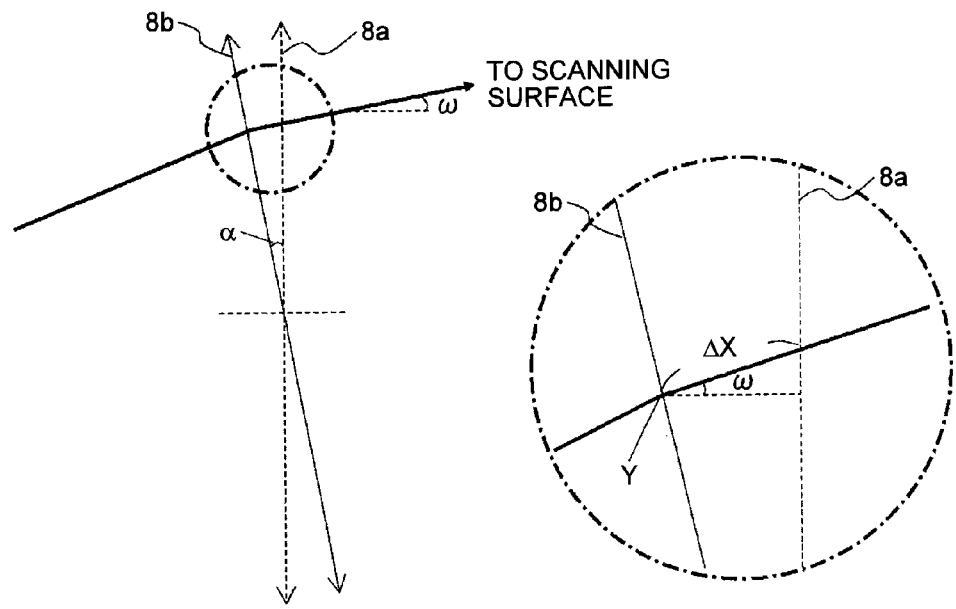
FIG. 6 is a main-scanning direction cross-sectional diagram illustrating a shift of a light flux according to movement of a lens plane of an individual lens due to rotation eccentricity of the individual lens.
Figure 7:
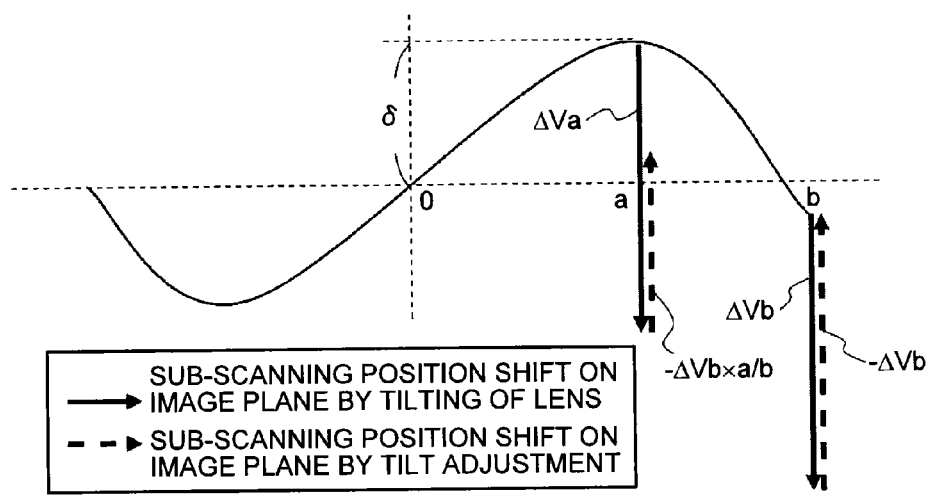
FIG. 7 is a waveform diagram illustrating an example of a shape of an undulation component of scan line curve on a scanning surface.

FIG. 5 is a sub-scanning direction cross-sectional diagram illustrating a shift of a light flux according to movement of a lens plane from 8a to 8b due to a rotation of the second scanning lens 8. The direction of the shift $\Delta X$ from the lens plane 8a to the lens plane 8b depends on whether the relevant light flux is closer to the light source or further from the light flux than the rotation center (optical axis in the embodiment) in the main-scanning direction. FIG. 5 illustrates the state of the case where the lens plane is tilted such that the one end closer to the light source becomes closer to the polygon mirror 5, regarding the light flux toward the image height closer to the light source and the direction is a direction in which the lens plane becomes further from the scanning surface (refer to FIG. 6).

In the case of the oblique incidence optical system, as long as the light flux passing through the second scanning lens 8 is not the light flux passing through the rotation center, the sub-scanning position where refraction occurs varies depending on the movement of the lens plane, so that the change in refraction angle occurs as illustrated in FIG. 5. The change in refraction angle is denoted by $\Delta\theta$, the power in the sub-scanning direction is denoted by $\phi$, and the shift amount of the sub-scanning position where the refraction occurs is denoted by $\Delta Z$. In this case, the relationship is approximately expressed as follows.

$$\Delta\theta = \phi \times \Delta Z$$

If the change in refraction angle occurs, when the light beam reaches the scanning surface, the sub-scanning position is also shifted. If the sub-scanning position shift amount $\Delta V$ on the scanning surface 11a is denoted by $\Delta V$, the following Formula (1) is satisfied.

$$\Delta V = (L \cdot \Phi - 1)\Delta Z \tag{1}$$

Herein, L denotes the optical path length from the second scanning lens 8 to the scanning surface 11a.

The tilt angle of the lens is denoted by $\alpha$, oblique incidence angle is denoted by $\beta$, the lens height through which the light flux passes is denoted by Y, and the angle between the light flux after the emission from the lens in the main-scanning cross section and the optical axis is dented by $\omega$. In this case, the sub-scanning position shift amount $\Delta Z$ is approximately expressed by the following Formula (2) by using $Y \sin \alpha = \Delta X \cos \omega$ from the main-scanning direction cross-sectional diagram illustrated in FIG. 6.

$$\Delta Z = \frac{Y \sin\alpha}{\cos\omega} \tan\beta \tag{2}$$

Figure 8A:
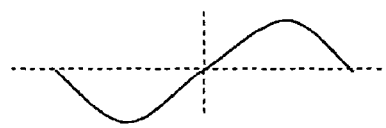
FIGS. 8A to 8D are diagrams illustrating examples of different shapes of an undulation component of scan line curve on a scanning surface.
Figure 8B:
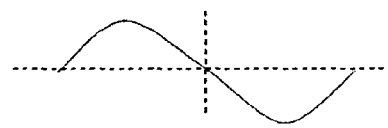
Figure 8C:
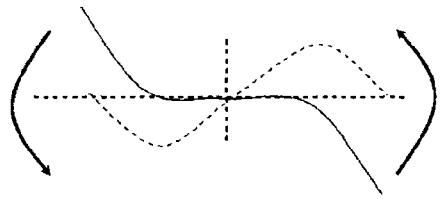
Figure 8D:
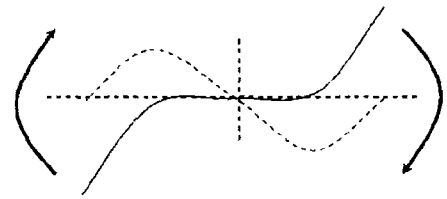

On the other hand, the undulation component of the scan line curve on the scanning surface takes, for example, the shape represented by such a third order function as FIG. 7 or FIGS. 8B to 8D. FIGS. 8C and 8D include the tilt (first order) component, and except for the tilt component, FIGS. 8C and 8D are equivalent to FIGS. 8A and 8B, respectively.

The image height having the largest curve is denoted by a, and the amount thereof is represented by $\delta$. Herein, by tilting the lens, the light flux toward the edge image height b is shifted by a size of $\Delta Vb$ in the sub-scanning direction. At the same time, with respect to the image height a, the light flux is shifted by a size of $\Delta Va$ in the sub-scanning direction. At the edge image height in the opposite side, since the curve is shifted in the direction opposite to the edge image height b, the tilt (first order) component is generated overall. Therefore, in the embodiment, by performing the scan line tilt adjustment, the tilt component is corrected. In the case where the adjustment is performed by $-\Delta Vb$ so that the sub-scanning position of the edge image height b is returned to the original position, with respect to the image height a, the sub-scanning position is adjusted by $-\Delta Vb \times a/b$. If the curve amount after the adjustment is smaller than the original curve amount $\delta$, it is said that the undulation of the scan line curve becomes small. That is, the condition formula is expressed by the following Formula (3).

$$-\delta < \Delta V_a + \delta - \frac{a}{b}\Delta V_b < \delta (\delta > 0) \qquad (3)$$

In addition, $\delta$ may have a negative value. In this case, Formula (3) becomes a formula where inequality is reversed. If the above formula is calculated by taking into consideration that the direction of $\Delta Va$ and $\Delta Vb$ is reverse to the direction of the sign of $\delta$, the following two formulas of Formula (4) and Formula (5) can be obtained.

$$\frac{a\Delta V_b}{b\Delta V_a} < 1 \qquad (4)$$

$$|\Delta V_a| < \frac{|2\delta|}{1 - \frac{a\Delta V_b}{b\Delta V_a}} \qquad (5)$$

Formula (4) denotes that the ratio $\Delta Va/\Delta Vb$ of shifts of the curves due to the tilt of the lens is larger than the image height ratio a/b (using the same lens), so that the undulation component of the curve can be corrected. Formula (1) and Formula (2) are inserted into the above formula, and if the ratio of lens heights which the light flux passes through and the image height ratio are substantially the same (a/b≈Ya/Yb), the following condition formulas (6) and (7) can be obtained.

$$\frac{(L_b \phi_b - 1)\cos\omega_a}{(L_a \phi_a - 1)\cos\omega_b} < 1 \qquad (6)$$

$$|\Delta V_a| < \frac{|2\delta|}{1 - \frac{(L_b \phi_b - 1)\cos\omega_a}{(L_a \phi_a - 1)\cos\omega_b}} \qquad (7)$$

That is, with respect to the lens under the condition of the condition formula (6), the undulation component of the scan line curve can be corrected by tilting the lens so that the condition formula (7) is satisfied.

Embodiment

Next, specific embodiments of the optical scanning device according to the present invention together with comparative examples where the lens is not tilted are illustrated by using numerical data.

The specifications of the polygon mirror 5 as a deflection unit of deflecting a light beam from the light source 1 illustrated in FIG. 1 are as follows.

A light flux having a wavelength of 660 nm is emitted from the light source 1 and becomes substantially parallel light by the coupling lens 2 having a focal length of 20.4 mm. The light flux formed as the substantially parallel light passes through the aperture 3 having a size of 2.8 mm (main-scanning direction) and 1.6 mm (sub-scanning direction) and is focused on the deflecting reflection plane 11a of the polygon mirror 5 as a line image elongated in the main scanning direction by the cylindrical lens 4 having a power of focal length 132.4 mm only in the sub-scanning direction. Herein, as the polygon mirror 5, a polygon mirror having an inscribed circle radius of 9 mm and the number of planes of 5 is used. With respect to the incidence angle for the polygon mirror 5, the light beam is incident with 70 degrees oblique to the normal line of the scanning surface in the main-scanning cross section and with 2.3 degrees oblique to the normal line of the deflecting reflection plane of the polygon mirror 5 in the sub-scanning cross section.

The function of scanning the light flux reflected by the polygon mirror 5 with a maximum angle of view of ±45.4 degrees and forming images on the image heights of ±163.5 mm which are latent image areas on the scanning surface 11a by the first scanning lens 7 and the second scanning lens 8 is provided. The both sides of the first scanning lens 7 and the second scanning lens 8 are expressed by the following Formula.

The plane shape in the main-scanning cross section is a non-arc shape, and when a paraxial radius of curvature in the main-scanning cross section in the optical axis is denoted by Rm, a distance in the main-scanning direction from the optical axis is denoted by Y, a conic constant is denoted by K, and high order coefficients are denoted by $A_4$, $A_6$, $A_8$, $A_{10}$, $A_{12}$, and $A_{14}$, a depth X in the optical axis direction is expressed by the following polynomial Formula (8).

$$X = \frac{Y^2/R_m}{1 + \sqrt{1 - (1+K)\cdot(Y/R_m)^2}} + A_4 \cdot Y^4 + \qquad (8)$$
$$A_6 \cdot Y^6 + A_8 \cdot Y^8 + A_{10} \cdot Y^{10} + A_{12} \cdot Y^{12} + A_{14} \cdot Y^{14}$$

Herein, since only the even ordered terms are used for high order terms, the main-scanning cross section shape is a system symmetric with respect to the optical axis.

In addition, when a paraxial radius of curvature in the sub-scanning cross section in the optical axis is denoted by Rs and higher order coefficients are denoted by $B_2$, $B_4$, $B_6$, and $B_8$, the formula representing that the sub-scanning curvature Cs is changed according to the main-scanning direction is expressed by the following Formula (9).

$$Cs(Y) = \frac{1}{Rs(0) + B_2 \cdot Y^2 + B_4 \cdot Y^4 + B_6 \cdot Y^6 + B_8 \cdot Y^8} \qquad (9)$$

Herein, since only the even ordered terms are used for the higher order terms, the sub-scanning curvature is a system symmetric in the main-scanning direction with respect to the optical axis.

Therefore, as each plane of the first scanning lens 7 and the second scanning lens 8, the planes where the main-scanning and sub-scanning shapes are symmetric in the main-scanning direction with respect to the optical axis are used.

Numeric data of the embodiment are listed in the following Table 1. The sign is defined so that the propagation direction of the light flux from the polygon mirror 5 to the scanning surface 11a is positive. The sub-scanning shapes of the two planes of the first scanning lens 7 and the first plane of the second scanning lens 8 are planar.

TABLE 1

|     | First Scanning Lens | | Second Scanning Lens | |
| --- | --- | --- | --- | --- |
|     | First Plane | Second Plane | First Plane | Second Plane |
| Rm  | −64.058 | −39.336 | −505.956 | 951.430 |
| K   | 0.000000E+00 | 0.000000E+00 | 0.000000E+00 | 0.000000E+00 |
| $A_4$ | 3.356179E−06 | 3.148535E−06 | 1.593859E−07 | −2.872398E−07 |
| $A_6$ | −4.853347E−09 | −5.021625E−10 | −5.243121E−11 | 3.202137E−11 |
| $A_8$ | 1.104018E−11 | 6.021343E−13 | 8.757256E−15 | −6.657379E−15 |
| $A_{10}$ | −1.608843E−14 | 3.430571E−15 | −5.116250E−19 | 1.283090E−18 |
| $A_{12}$ | 1.165331E−17 | −5.757764E−18 | −9.768046E−24 | −1.191353E−22 |
| $A_{14}$ | −3.046534E−21 | 2.904838E−21 | 1.314736E−27 | 3.914622E−27 |
| Rs  | ∞ | ∞ | ∞ | −31.384 |
| $B_2$ | 0.000000E+00 | 0.000000E+00 | 0.000000E+00 | 2.885176E−06 |
| $B_4$ | 0.000000E+00 | 0.000000E+00 | 0.000000E+00 | −5.308142E−10 |
| $B_6$ | 0.000000E+00 | 0.000000E+00 | 0.000000E+00 | 6.627387E−14 |
| $B_8$ | 0.000000E+00 | 0.000000E+00 | 0.000000E+00 | −3.338061E−18 |

Figure 9:
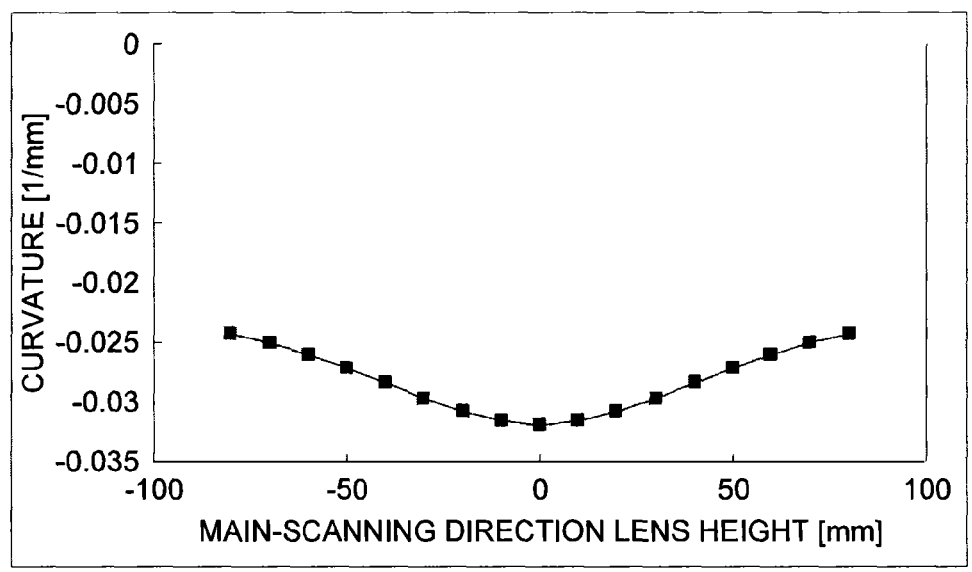
FIG. 9 is a curvature distribution diagram illustrating a sub-scanning curvature distribution with respect to a main-scanning direction lens height on a second plane of a second scanning lens according to the embodiment.

In addition, the sub-scanning curvature distribution with respect to the main-scanning direction lens height on the second plane of the second scanning lens 8 is illustrated in FIG. 9.

Subsequently, specific numeric values of the optical arrangement following the polygon mirror 5 and refractive indexes thereof are listed in the following Table 2.

TABLE 2

|     | Distance [mm] | Refractive Index |
| --- | --- | --- |
| Deflecting Reflection Point - Soundproof Glass R1 | 12.3 |   |
| Soundproof Glass R1 - Soundproof Glass R2 (Center, Thick) | 1.7 | 1.514 |
| Soundproof Glass R2 - L1R1 | 14.5 |   |
| L1R1 - L1R2 (Center, Thick) | 8.5 | 1.532 |
| L1R2 - L2R1 | 72.3 |   |
| L2R1 - L2R2 (Center, Thick) | 3.0 | 1.532 |
| L2R2 - Anti-Vibration Glass R1 | 75.9 |   |
| Anti-Vibration Glass R1 - Anti-Vibration Glass R2 (Center, Thick) | 1.9 | 1.514 |
| Anti-Vibration Glass R2 - Scanning Surface | 49.7 |   |

In addition, in the above Table 2, the first scanning lens is denoted by L1, the second scanning lens is denoted by L2, the first plane is denoted by R1, and the second plane is denoted by R2. The soundproof glass 6 and the anti-vibration glass 10 are arranged as illustrated in FIGS. 1 and 2. The soundproof glass 6 is 6 degrees (6°) oblique to the direction parallel to the main-scanning direction and with 4.5 degrees)(4.5° with respect to the direction parallel to the sub-scanning direction, and the anti-vibration glass 10 is 12 degrees (12°) oblique to the direction parallel to the sub-scanning direction.

When the optical system is used, in the case where the lens is not tilted, the scan line curve is illustrated in FIG. 11 as described above, and the maximum curve δ=+6 μm is taken in the vicinity of the image height of +100 mm. With respect to the light flux toward the image height of +100 mm, each value is approximately as follows.

$La$=139.2[mm], $\phi a$=0.015 [1/mm], $\omega a$=23.6[deg]

In addition, with respect to the light flux toward the edge image height, each value is as follows.

$Lb$=150.5[mm], $\phi b$=0.012 [1/mm], $\omega b$=30.0[deg]

Since these values satisfy the condition formula (6), in the optical system, the undulation component of the scan line curve can be corrected by tilting the scanning lens. By calculating the condition formula (7) from the above values, the sub-scanning position shift amount is as follows.

$|Va|$<55.5 [μm]

Figure 12:
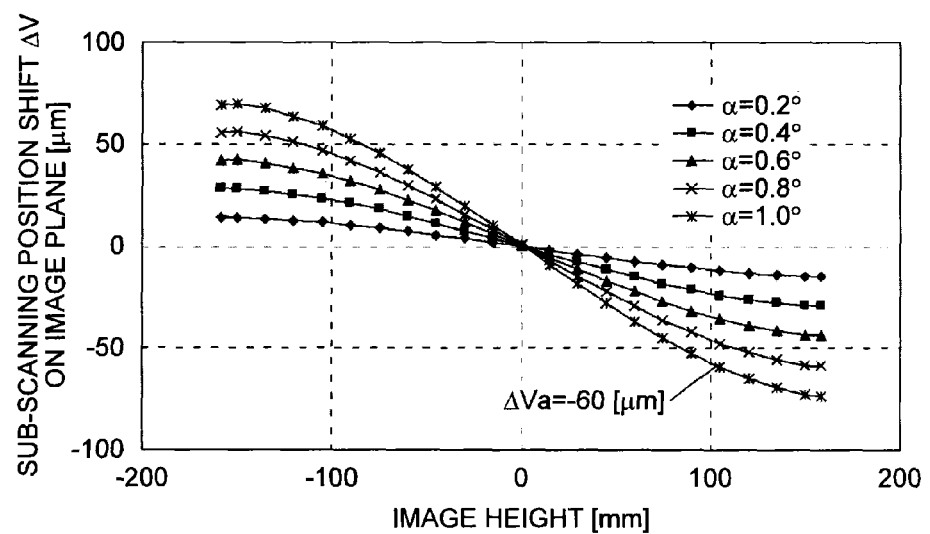
FIG. 12 is an image height/image plane scanning position shift relationship diagram illustrating a relationship between a tilt amount α of a lens and a sub-scanning position shift ΔV on an image plane toward each image height in the embodiment.
Figure 13:
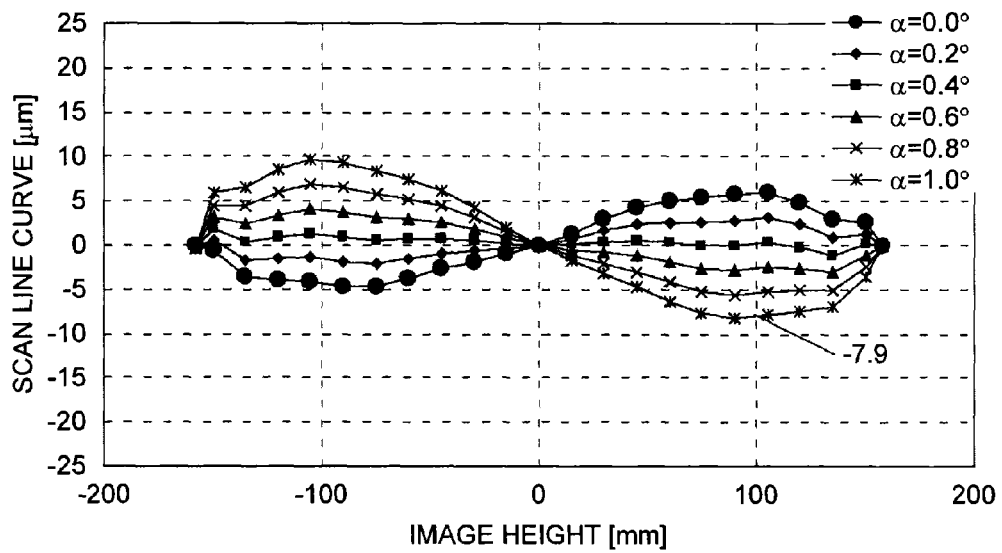
FIG. 13 is an image height/scan line curve relationship diagram illustrating scan line curves with respect to image heights in the cases between which the tilt amount of the lens is changed in the embodiment.

FIGS. 12 and 13 illustrate a relationship between a tilt amount α of a lens and a sub-scanning position shift ΔV on an image plane toward each image height and a state of the scan line curve after the lens is tilted. As illustrated in FIG. 12, in order to the condition formula (6), in any line, undulation of ΔV occurs in the direction opposite to the asymmetric component of the scan line curve illustrated in FIG. 11.

However, in the case of α=1.0 degrees)(1.0°, as illustrated in FIG. 12, with respect to the image height of +100 mm, approximately ΔVa=60 [μm], and since the condition formula is not satisfied, as illustrated in FIG. 13, the curve of the image height of +100 mm image height becomes −7.9 [μm] and exceeds the original value of 6 [μm]. Therefore, it can be understood that the curve cannot be reduced.

Figure 15:
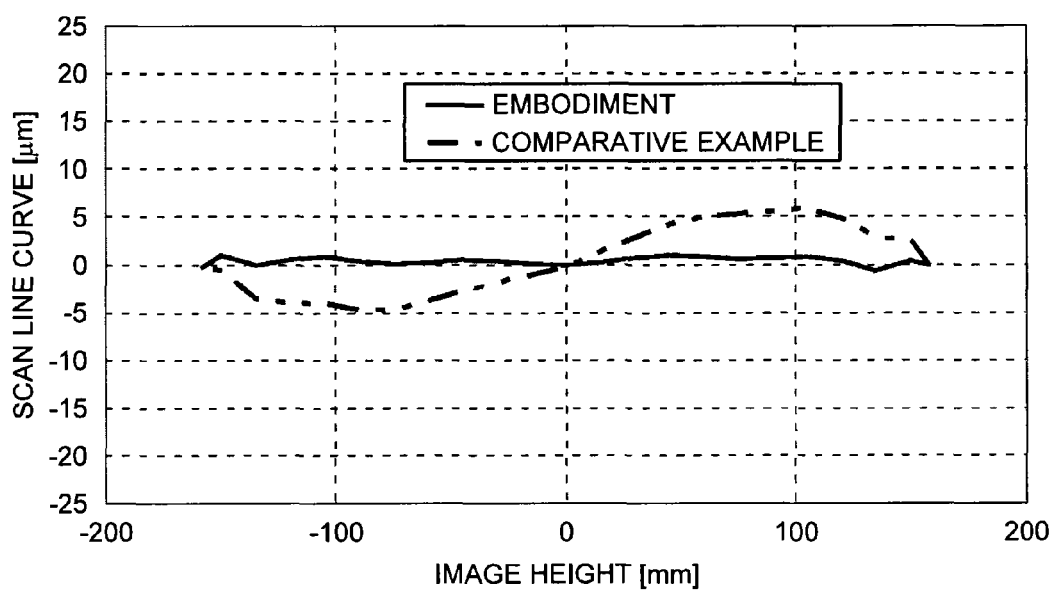
FIG. 15 is an image height/scan line curve relationship diagram illustrating comparison of the scan line curve of FIG. 11 and the scan line curve according to the embodiment.

In this embodiment, the second scanning lens 8 is tilted with 0.35 degrees)(0.35° in the main-scanning cross section such that the one end of the second scanning lens 8 closer to the light source becomes closer to the polygon mirror 5 so that the p-v value of the scan line curve is minimized. Accordingly, the sub-scanning position shift ΔV on the image plane of the light flux toward each image height is illustrated in FIG. 14, and the comparison of the scan line curve of FIG. 11 and the scan line curve of this embodiment is illustrated in FIG. 15. The ΔV for the image height of +100 mm is −17.8 [μm], and it does satisfy the condition formula (7). In addition, in Comparative Example, the p-v value of the scan line curve is 10 μm, and however, by embodying the present invention, the value is suppressed to be 2 μm or less.

Figure 21:
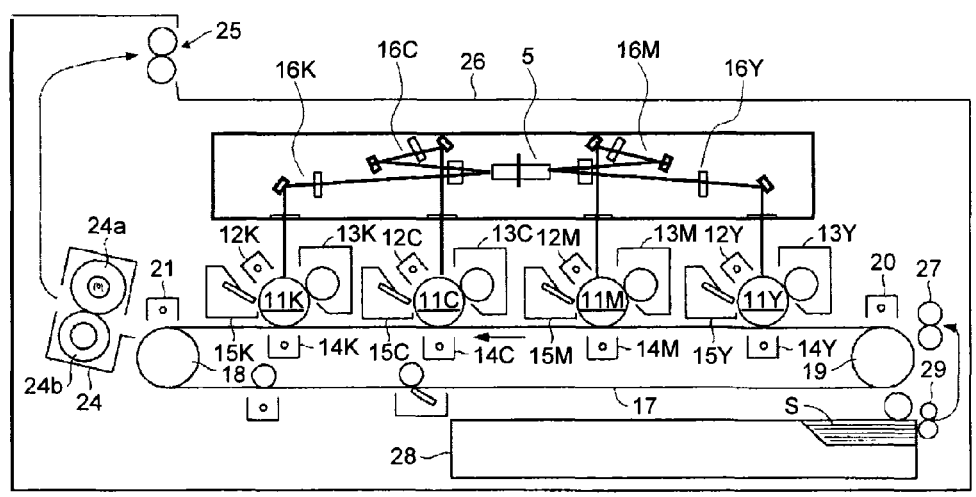
FIG. 21 is a schematic cross-sectional diagram illustrating a configuration of a second embodiment of an image forming apparatus using the optical scanning device according to the present invention.

Next, an embodiment of an image forming apparatus using an optical scanning device according to a second embodiment of the present invention will be described with reference to FIG. 21.

The second embodiment is an example where the optical scanning device according to the present invention is applied to a tandem type full color laser printer. In FIG. 21, a transport belt 17 which transports a transfer sheet S fed from a paper feeding cassette 28 arranged in the horizontal direction is installed in the lower portion inside the apparatus.

A photoconductor 11Y for yellow Y, a photoconductor 11M for magenta M, a photoconductor 11C for cyan C, and a photoconductor 11K for black K are arranged on the transport belt 17 in this order with an equal interval from the upstream in the transport direction of the transfer sheet S. In addition, hereinafter, reference numerals are distinguished by appropriately attaching subscripts Y, M, C, and K. The photoconductors 11Y, 11M, 11C, and 11K are formed with all the same diameter, and in the vicinity thereof, and process members of performing the respective processes according to the electrophotography process are sequentially installed.

If the photoconductor 11Y is taken as an example, a charger 12Y, a scanning optical system 16Y, a developing device 13Y, a transfer charger 14Y, a cleaning unit 15Y, and the like are sequentially installed. The other photoconductors 11M, 11C, and 11K are configured in the same manner. That is, in the second embodiment, the surfaces of the photoconductors 11Y, 11M, 11C, and 11K are used as the scanning surfaces or irradiation surfaces set for the respective colors, and the scanning optical systems 16Y, 16M, 16C, and 16K are installed in one-to-one correspondence with respect to the respective photoconductors.

However, the scanning lens is commonly used for Y, M, C, and K. In addition, in the vicinity of the transport belt 17 which is stretched on rollers 18 and 19 to transport the transfer sheet, a registration roller 27 and a belt charger 20 are installed to be positioned upstream of the photoconductor 11Y. In addition, a belt separation charger 21 and a fixing device 24 including a pair of rollers 24a and 24b are sequentially installed to be positioned downstream side of the photoconductor 11K in the rotation direction of the belt 17 and are connected to a paper ejection roller 25 toward a paper ejection tray 26. In addition, 29 denotes a paper feeding roller which feeds the transfer sheet S of the paper feeding cassette 13.

In such a schematic configuration, for example, in a full color mode (multi-color mode) period, the electrostatic latent images corresponding to the respective color signals are formed on the surfaces of the photoconductors 11Y, 11M, 11C, and 11K by performing optical scanning of the light beams on the photoconductors 11Y, 11M, 11C, and 11K by using the optical scanning devices 16Y, 16M, 16C, and 16K based on the color image signals for Y, M, C, and K. The electrostatic latent images are developed with color toners by the corresponding developing devices 13Y, 13M, 13C, and 13K to become toner images, and the toner images are sequentially transferred to be superposed on the transfer sheet S which is electrically adsorbed on the transport belt 17 to be transported, so that a full color image is formed on the transfer sheet S. The full color image is fixed by the fixing device 24, and after that, the sheet is ejected to to the paper ejection tray 26 by the paper ejection roller 25.

The scanning optical systems 16Y, 16M, 16C, and 16K of the image forming apparatus described above are used as the optical scanning device according to the first embodiment described above, so that it is possible to implement an image forming apparatus capable of securing a reproducibility of a high-quality image without color shift by effectively correcting scan line curve.

According to an embodiment, an asymmetric component of scan line curve can be corrected with a simple configuration irrespective of layout while using common lenses, and it is possible to provide an optical scanning device having small color shift.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a plurality of light source devices;
a common optical deflector that deflects light beams from the light source devices; and
a scanning optical system that focuses the deflected light beams on different scanning surfaces to scan the scanning surfaces in a main-scanning direction, wherein
all the light beams from the light source devices are incident on the optical deflector in directions oblique to a normal line of the scanning surfaces in a main-scanning cross section and to a normal line of a deflecting reflection plane of the optical deflector in a sub-scanning cross section,
the scanning optical system includes a common lens which is commonly used for the light beams scanned by the same deflecting reflection plane and individual lenses which are individually arranged for the respective light beams and have a plane shape symmetric in the main-scanning direction,
when a light flux whose sub-scanning position of when reaching the scanning surface is farthest from a sub-scanning position at a central image height is defined as a first light flux, and a light flux toward an edge image height closer to where the first light flux reaches is defined as a second light flux, and an optical path length of the first light flux from the individual lens to the scanning surface is denoted by La, a power in the sub-scanning direction at a position where the first light flux passes through the individual lens is denoted by φa, an emission angle of the first light flux from the individual lens in the main-scanning cross section is denoted by ωa, an optical path length of the second light flux from the individual lens to the scanning surface is denoted by Lb, a power in the sub-scanning direction at a position where the second light flux passes through the individual lens is denoted by φb, and an emission angle of the second light flux from the individual lens in the main-scanning cross section is denoted by ωb, the individual lens satisfies the following condition formula (6), $$\frac{(L_b \phi_b - 1)\cos\omega_a}{(L_a \phi_a - 1)\cos\omega_b} < 1 \tag{6}$$

an optical axis of the individual lens is arranged obliquely to the normal line of the scanning surface in the main-scanning cross section such that the following condition formula (7) is satisfied, when a sub-scanning position shift amount of the first light flux on an image plane by tilting the individual lens is denoted by ΔVa, and a difference between a central image height and a sub-scanning position of the first light flux on the image plane of when the individual lens is not tilted is denoted by δ

$$|\Delta V_a| < \frac{|2\delta|}{1 - \frac{(L_b \phi_b - 1)\cos\omega_a}{(L_a \phi_a - 1)\cos\omega_b}}. \tag{7}$$

2. The optical scanning device according to claim 1, wherein, a power of the individual lens in the sub-scanning direction continuously decreases from an on-axis portion to an off-axis portion in the main-scanning direction.

3. The optical scanning device according to claim 1, wherein the scanning optical system is disposed such that elements of the scanning optical system are face each other with the optical deflector interposed therebetween, and every individual lenses facing each other have the same shape.

4. The optical scanning device according to claim 1, wherein the scanning optical system includes a scan line tilt adjustment mechanism which adjusts a sub-scanning direction tilt of a scan line of scanning the scanning surface in the main-scanning direction.

5. The optical scanning device according to claim 1, wherein, when a light flux which reaches an image height axis-symmetric to an image height where the first light flux reaches, about a central image height is defined as a third light flux, difference between a sub-scanning position of the scanning surface where the third light flux reaches and the sub-scanning position of the central image height is substantially the same as difference between a sub-scanning position where the first light flux reaches and the sub-scanning position of the central image height.

6. The optical scanning device according to claim 1, wherein an imaging magnification ratio $\beta$ in the sub-scanning direction of the scanning optical system is $|\beta| \leq 1.5$.

7. The optical scanning device according to claim 1, wherein, after the second light flux is deflected by the optical deflector, an angle formed by the second light flux and the normal line of the scanning surface in the main-scanning cross section is 40° or more.

8. An image forming apparatus of forming an image by performing an electrophotography process, comprising the optical scanning device according to claim 1 as a unit of performing an exposing process of the electrophotography process.

* * * * *